UNITED STATES PATENT OFFICE.

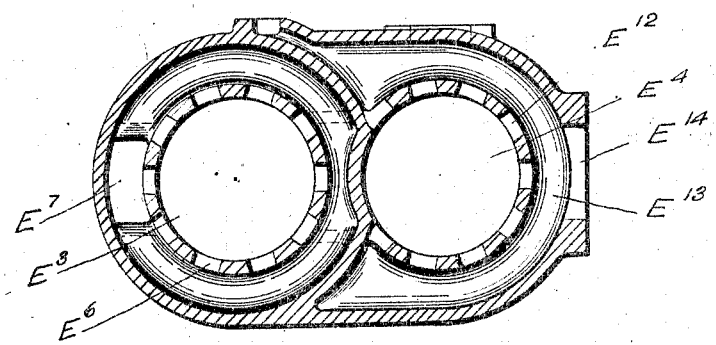
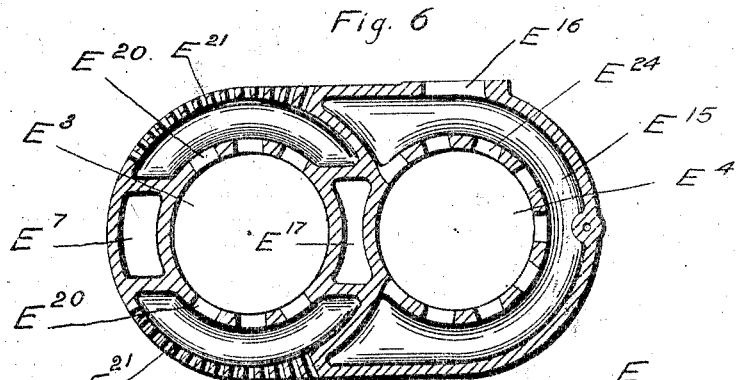
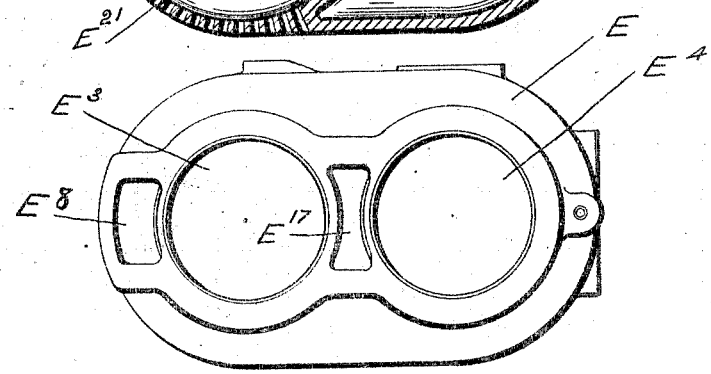

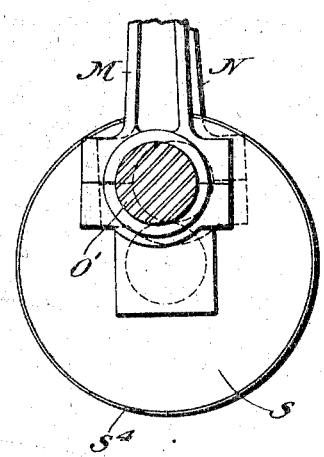
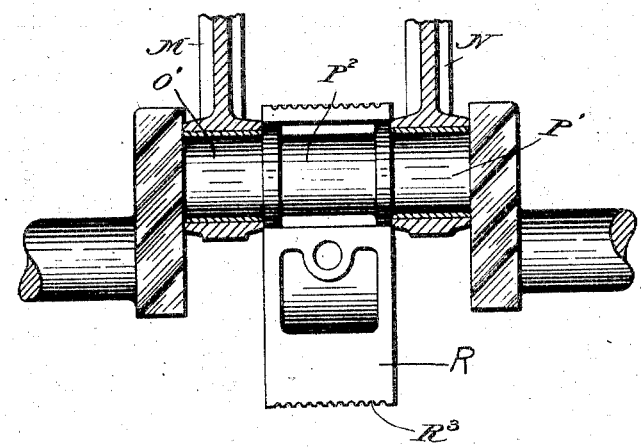
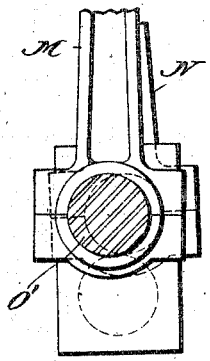
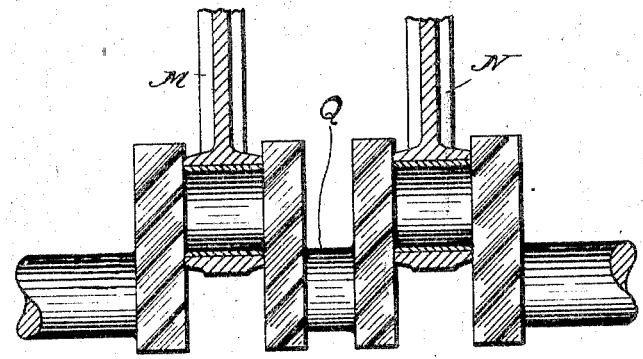
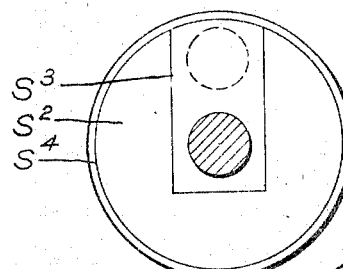

BAXTER M. ASLAKSON, OF SALEM, OHIO.

GAS-ENGINE.

1,081,480.  Specification of Letters Patent.  Patented Dec. 16, 1913.

Application filed July 9, 1908. Serial No. 442,643.

*To all whom it may concern:*

Be it known that I, BAXTER M. ASLAKSON, a citizen of the United States, and residing at Salem, Columbiana county, Ohio, have invented certain new and useful Improvements in Gas-Engines, of which the following is a specification.

My invention relates to gas engines of the two cycle type, and the object of same is to provide an engine comprising two cylinders which may be scavenged by compressed air and in which the charge is delivered to the cylinders under pressure; to attain a high degree of economy of fuel for a given power generated; and to provide an engine without valves.

A further object is to provide an engine having simple parts which are easy to cast and machine, and to construct the engine so that the pistons will control the ports and compress the air to scavenge the cylinders, and compress the charge of gas for the cylinders.

A further object is to cause the piston which controls the exhaust ports, to move in advance of the other piston, so as to uncover the exhaust port before the inlet port is opened, and to close said exhaust port before the inlet port is closed.

A further object is to provide crank chambers in which the air and gas charges may be compressed, and to provide means for filling the space in said crank cases, so that a high compression of gas may be effected therein.

Figure 1:
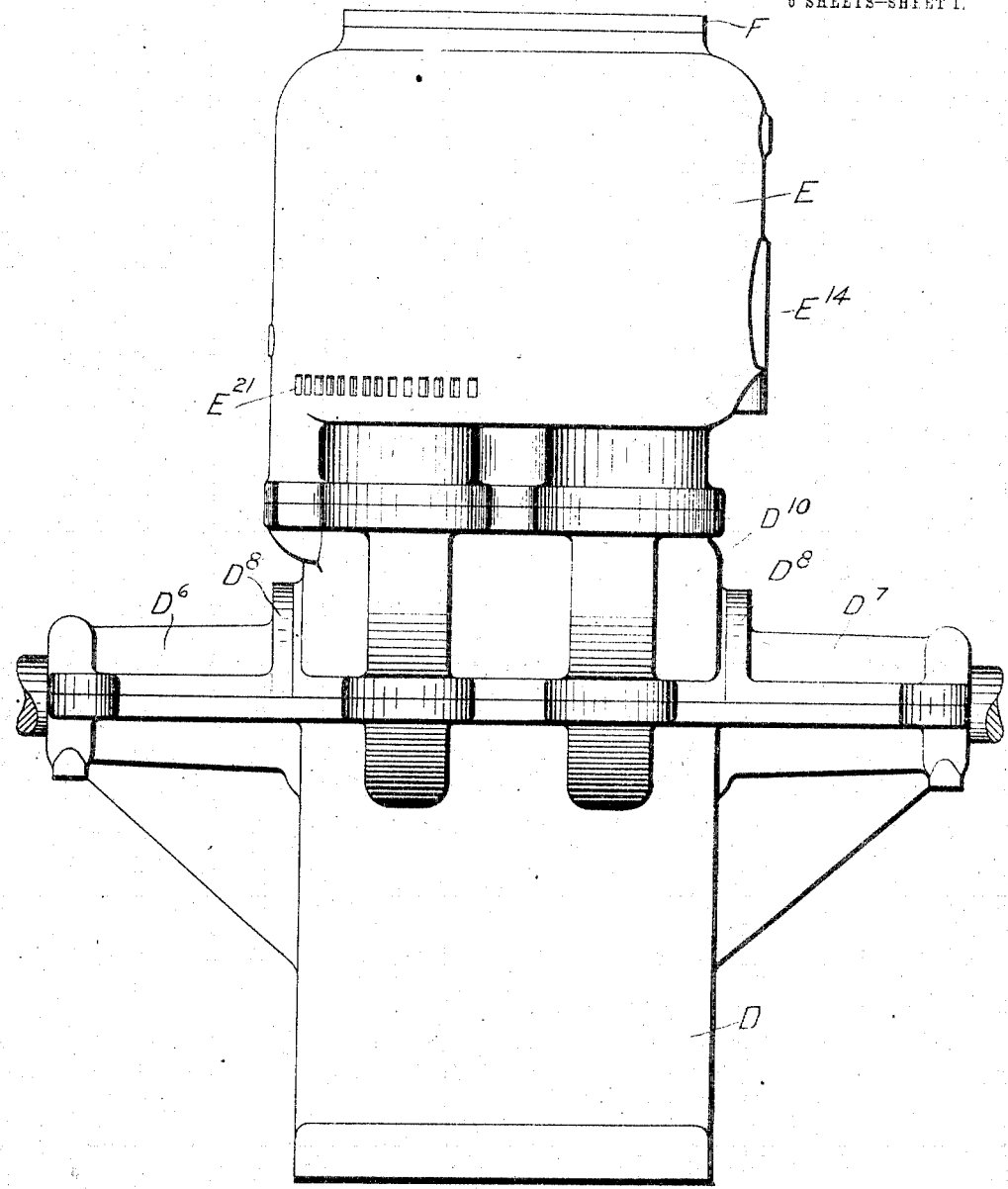
Figure 2:
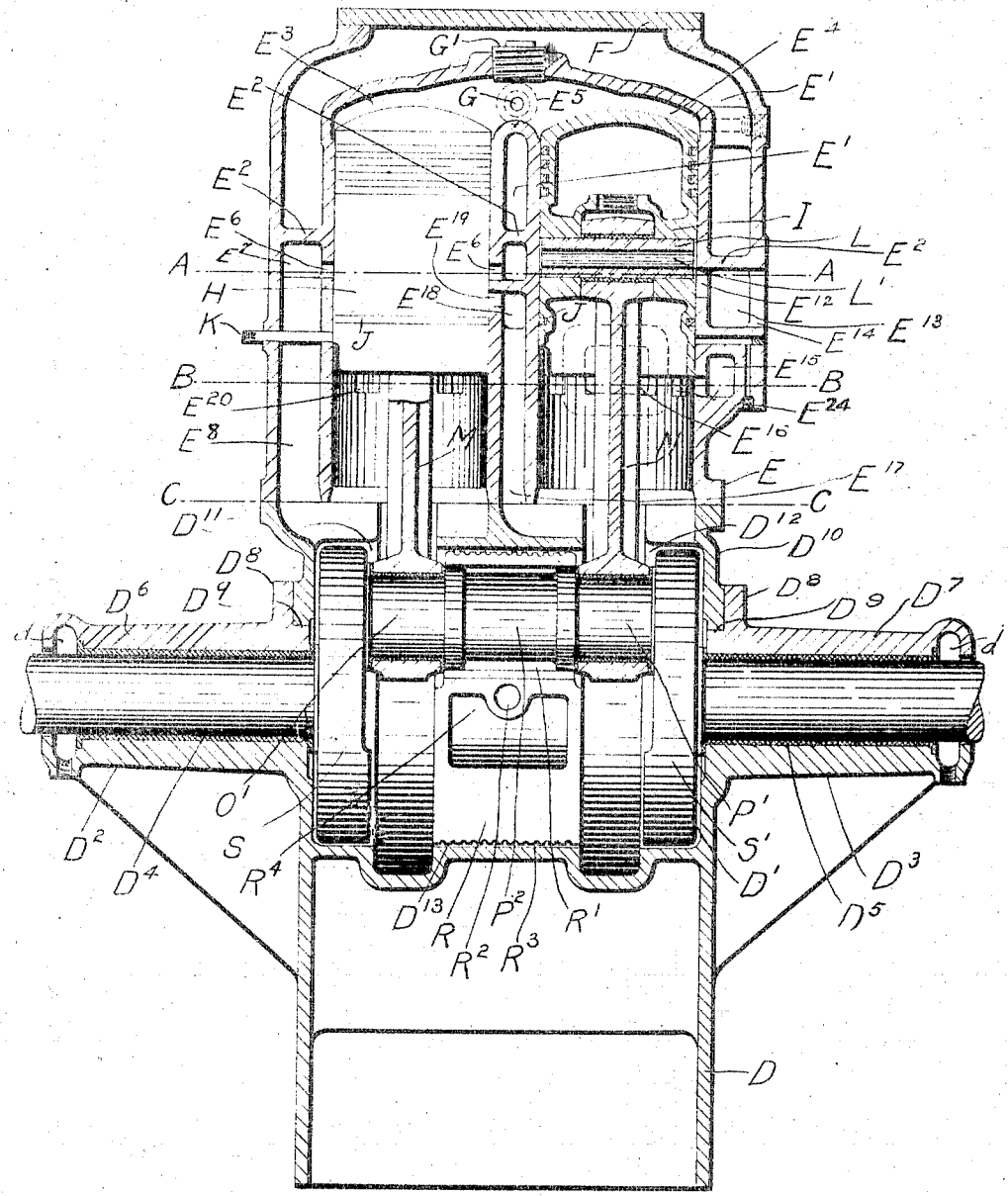
Figure 3:
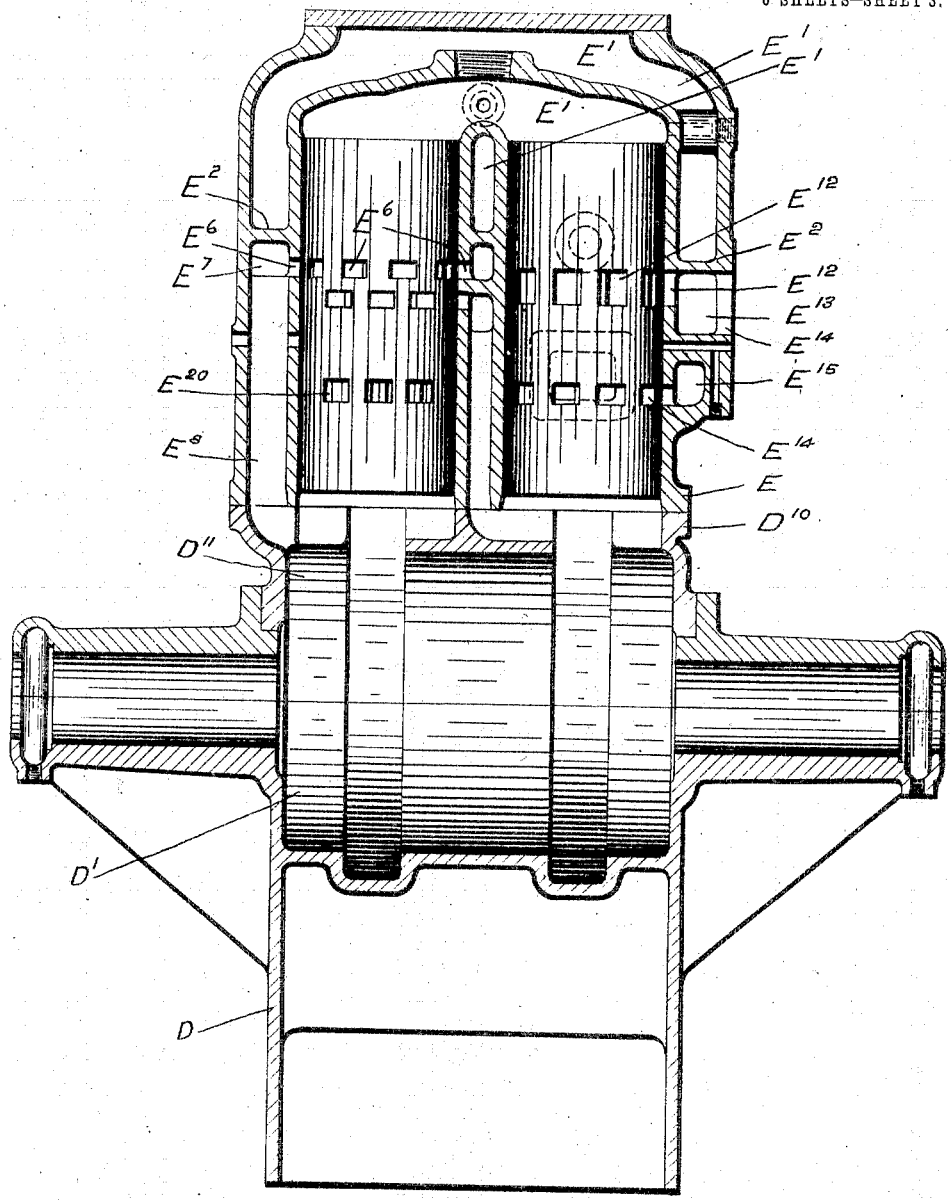
Figure 4:
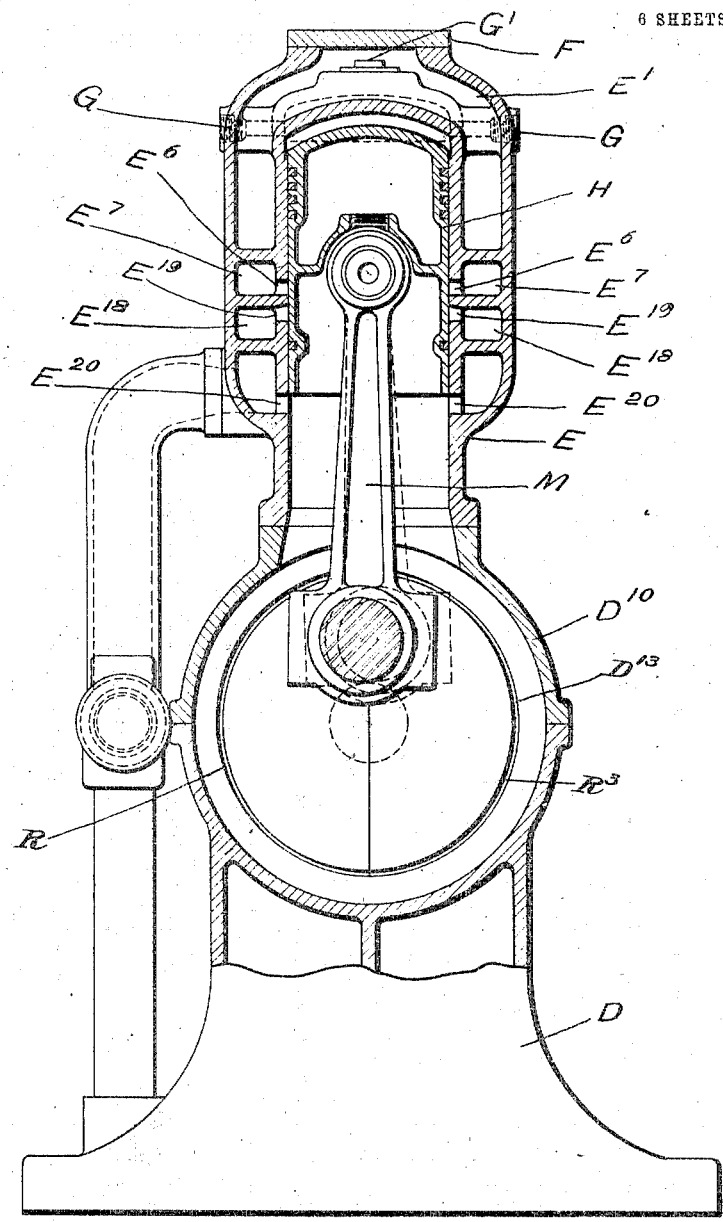

Referring to the drawings which form a part of this specification, Figure 1, is a front elevational view of my improved engine. Fig. 2, is a longitudinal sectional view thereof. Fig. 3, is a longitudinal sectional view through the cylinders and crank cases with the pistons and cranks etc. removed. Fig. 4, is a cross sectional view through the left hand cylinder of the engine and the crank case therefor. Fig. 5, is a plan sectional view on line A—A of Fig. 2. Fig. 6, is a plan sectional view on line B—B of Fig. 2. Fig. 7, is an inverted plan view on line C—C of Fig. 2. Fig. 8, is a detail view of a portion of the crank shaft cranks and connection rods, and discloses the partition which separates the crank chambers, mounted between the wristpins of the cranks. Fig. 9, is a side view of a portion of one of the cranks with its disk weight mounted thereon. Fig. 10, is a view of a modified form of crank. Fig. 11, is a side view of same; and Fig. 12, is a side view of one of the cranks disks mounted on a crank.

D, indicates a casting which constitutes a base for the engine, and is provided with a chamber D', and projecting bearings $D^2$ and $D^3$, in which are located liners $D^4$ and $D^5$ respectively.

The upper halves of the bearings which form the cap portions, and are indicated by $D^6$ and $D^7$, are duplicates of each other, and are provided with a flanged portion $D^8$, and an inwardly projecting portion $D^9$ which extends under the upper portion of the crank case $D^{10}$. By this arrangement the portions $D^6$ and $D^7$ are held more firmly in place, as will be readily understood, and by a single pair of bolts at their outer ends. Each box is provided with an annular groove $d$, having an outlet on its under side to permit overflow of oil to escape by proper pipes to a suitable receptacle. The crank case portion $D^{10}$ is bolted to the base portion D, by passing bolts through their abutting flanges in the usual manner. The cylinder casting E is in turn bolted to the casting $D^{10}$, and is provided with a water chamber E' which is closed on its top by a cover F and its bottom by a partition $E^2$. There are two cylinders formed in the casting E indicated by $E^3$ and $E^4$ respectively, which are in open communication with each other at their upper ends by a passage $E^5$ which forms a part of the combustion chamber.

G, indicates the position of the spark plug, and directly above same is a plug G', the opening in which it rests being utilized to assist in supporting the core for the cylinders when the casting is being molded. Directly below the partition $E^2$ in the cylinder $E^3$ are ports $E^6$ which communicate with an annular chamber $E^7$, which in turn is in open communication with a conduit $E^8$ which leads through the casting $D^{10}$ to the crank chamber $D^{11}$, which is in open communication with the under side of the piston H.

Directly below the partition $E^2$ in cylinder $E^4$ are ports $E^{12}$ which are in open communication with a semiannular chamber $E^{13}$ which leads to the exhaust port $E^{14}$ of the engine. Located below the ports $E^{12}$ are ports $E^{24}$ which open into the cylinder on one side and into a semiannular chamber $E^{15}$, which communicates with the gas inlet $E^{16}$. Formed in the casting E is a conduit $E^{17}$ which communicates with the crank chamber $D^{12}$ at one end and with a chamber $E^{18}$ at the other end, and ports $E^{19}$ open from chamber $E^{18}$ into the cylinder $E^3$.

$E^{20}$ indicate inlet ports for air and are in open communication with inlet ports $E^{21}$ in the casing (see Figs. 1 and 6).

The tops of the series of ports $E^6$ and $E^{12}$ are nearly in alinement with each other, and the ports $E^{12}$ extend farther downward than ports $E^6$, and both series of ports are controlled by the pistons H and I, as well as the ports $E^{19}$, and are open when the pistons are in their lowest positions in the cylinders, and also the ports $E^{24}$ and $E^{20}$ are controlled by the pistons and are open when the pistons are in their highest positions. Each piston is provided with a piston ring J which over-runs the end of an oil passage K through which oil may be carried under pressure, and which serves to carry a film of oil over the surface of the cylinders to lubricate the same. It will be noted that the wrist pins L are formed hollow and that they overrun the ends of the respective oil passages, so that the oil will flow through them to the opposite sides of the pistons, and the chambers L' serve to carry sufficient oil to thoroughly lubricate the cylinders.

Extending from the wrist pins of the pistons are connecting rods M and N respectively, which are connected to crank pins O' and P' respectively, which in turn are connected together by extending the crank-pins to form a portion $P^2$ as indicated in Figs. 2 and 8, or they may be connected by forming double cranks as shown in Fig. 10 and joining them in line with the axis of the main shaft as shown at Q.

The crank-pin P' which is connected with the piston I, which is the piston which controls the exhaust port of the engine, is set about 10 degrees in advance of the crank-pin O', so that in operation the exhaust ports $E^{12}$ will be opened in advance of the inlet ports $E^6$, and will be closed in advance of same on the return strokes. By which means the exhaust of the engine is more perfectly effected, and the new charge of fuel more perfectly trapped in the cylinders. Mounted on the portion $P^2$ of the cranks is a circular drum R which is made in two halves one half being shown in the drawing to illustrate the inner construction, and is provided with an opening R' near one side, which fits over said portion $P^2$, and each half is also provided with openings $R^2$ through which a bolt is passed to hold the drum together and to the portion $P^2$. The drum R is preferably provided with a series of grooves $R^3$ in its periphery, and closely fits a cylindrical opening $D^{13}$ formed in the crank-case between the chambers $D^{11}$ and $D^{12}$, and serving as a partition to complete the formation of the said last named chambers. The grooves in the drum become filled with oil from the crank case and helps to effect a complete closure between the last mentioned chambers. In case the form of cranks shown in Fig. 10 were used, the drum R would be formed with an opening at its center instead of eccentric, as shown in Fig. 2, as will be readily understood.

The drum R is shown as having a chamber $R^4$ formed therein, which may be increased or decreased in size until the proper amount of metal is left to properly balance the engine in running balance, when used in connection with the balance disks S and S'; which also serve the function of filling up the space in the crank chambers so that a higher pressure of gas may be generated in the said chambers than would otherwise be the case. The crank disks S and S' are formed and secured to the cranks as illustrated in Figs. 9 and 12, the central portion $S^2$ having a rectangular opening $S^3$ which fits over the sides of the crank as shown, and a steel band $S^4$ is shrunk on the periphery of disk S and serves to hold the parts firmly and securely together.

The operation of the engine is as follows: Assuming the inlet $E^{16}$ to be in communication with a source of gas fuel of proper mixture, and the space below the piston I filled with same, and the chamber and space below piston H to be filled with air which has entered by way of ports $E^{20}$ and inlets $E^{21}$, the pistons in making their downward strokes would cover the ports $E^{24}$ and $E^{20}$ and compress the respective gases in the chambers $D^{11}$ and $D^{12}$, and since these pressures are practically the same in both chambers, the gas in one chamber will not flow past the partition R, but both gases will flow through their respective conduits $E^8$ and $E^{17}$ to the air inlet ports $E^6$ and fuel inlet ports $E^{19}$, and when the piston H has passed ports $E^6$ the compressed air will flow through cylinders $E^3$ and $E^4$ and out through exhaust ports $E^{12}$, and immediately thereafter the piston H will uncover ports $E^{19}$ admitting the fuel charge to the cylinder. Immediately thereafter the pistons reverse their direction of travel and the fuel supply is cut off at about the time that the exhaust is closed, so that no fuel is lost through the exhaust, and the cylinders are trapped full of air and gas under pressure which is further compressed by the upward stroke of the pistons, and ignited. On the downward stroke, the exhaust port is opened first by reason of the advance of the crank-pin on this side, and this gives time for the pressure to drop before the air port $E^6$ is opened, so that when it is opened, the air will flow rapidly through the cylinders to scavenge same, and thus permit a mixture free from burned gases, to be compressed on the following upward stroke of the pistons.

It will be understood that the pistons in making their upward strokes, will create a reduction of pressure in the chambers below the pistons, which will cause air and gas to flow quickly therein as soon as the pistons uncover the ports $E^{24}$ and $E^{20}$, and on the downward stroke of the pistons these ports will be closed thereby, and the gas compressed as above described. By reason of the advance of the piston I over H, a somewhat earlier period of ignition may be effected without loss of power from what is commonly known as "kicking back," and better economy is obtained by reason of this fact. Oil may be used in the crank case chambers to serve as a lubricating means for the crank-pins and main shaft bearings, and is thrown to the cylinders in the usual way as when splash lubrication is used.

Having thus described my invention, what I claim as new and desire to secure by Letters Patent is,

1. A gas engine comprising a base forming the lower half of a crank chamber and having projections forming bearings, caps provided with flanged portion and inward projections for said bearings, a casting provided with two chambers provided with openings in their lower ends suitably secured to said base and adapted to fit over the inner ends of said caps, and forming the upper half of the crank case a casing forming two cylinders having communication at their upper end suitably secured on said casting, one of said cylinders being provided with air inlet ports and the other cylinder with outlet ports in communication with the atmosphere, and a gas inlet port in communication with the compression chamber, a piston in each of said cylinders adapted to control said ports and compress air and gas respectively in said chambers, one of said pistons being arranged to begin its stroke in advance of the other, substantially as described.

2. A gas engine comprising a base forming the lower half of a crank chamber and provided with projections upon each side thereof, caps secured on said projections, a casting forming the upper half of the crank case and having a flange suitably secured to said base, a casting having two parallel cylinders formed therein, suitably secured upon said first mentioned casting, said cylinders being in open communication with each other respectively at their upper ends and in communication with the crank chamber, one of said cylinders being provided with inlet ports and the other with outlet ports in communication with the working chamber, the piston in each of said cylinders adapted to control the respective ports, one of said pistons being arranged to begin its stroke in advance of the other piston, crank pins suitably mounted in said base, rods connecting said pistons with said crank pins, a drum comprising two halves rigidly secured together, mounted on one of said crank pins between said rod connections and provided with a series of peripheral grooves adapted to fit in the chamber formed in the base, substantially as described.

3. A gas engine comprising a casting having a crank chamber, and provided with projections forming bearings on opposite sides thereof, caps for said projections having inwardly projecting portions, a crank shaft mounted in said bearings, a crank case secured upon said first mentioned casting, and a casing forming two cylinders suitably secured upon said crank casing, said cylinders having communication at their upper ends, one of said cylinders being provided with inlet ports and the other with outlet ports in communication with the crank chamber, pistons mounted in said cylinders, rods connecting said pistons with the crank shaft, a drum carried by said crank shaft provided with peripheral grooves and serving as a partition within the crank case to form separate crank chambers, as and for the purpose set forth.

4. A gas engine comprising a base and casting forming a crank chamber and provided with projecting bearing portions upon opposite sides thereof, caps for said projecting bearing portions provided with inwardly extending projections, a casing adapted to fit over said inwardly extending projections, a main shaft mounted in said bearings, cranks mounted on said main shaft, a rotating drum having a series of peripheral grooves mounted on said cranks forming a separate crank chamber at each side thereof, a casting having two cylinders in open communication at their upper ends, and having communication at their lower ends with the crank chamber, suitably secured on said crank casing, a piston in each of said cylinders, and connecting rods extending from said pistons to said cranks, substantially as described.

5. A gas engine comprising a base and casting forming a crank chamber therein and provided with projections upon opposite sides, said projections forming bearings, a crank shaft mounted in said bearings, caps having inward projections for said bearings, a crank casing suitably secured upon said base casting, a casing forming two cylinders having communication at their upper ends and having communication at their lower end with the crank chamber and provided with inlet and exhaust ports in communication with the atmosphere, a piston in each of said cylinders, rods connecting said pistons with said crank shaft, a partition carried by said crank shaft and forming two crank chambers, a crank disk mounted on each of said cranks and comprising an inner portion having an opening in which the crank rests, and an outer band adapted to hold the disk and band together, as and for the purpose set forth.

6. A gas engine comprising a casting having two cylinders therein in open communication at their upper ends, one of which is provided with inlet ports for air and the other with exhaust ports, said ports having their top edges in alinement with each other, one of said cylinders having gas inlet ports located immediately below said air inlet ports and each of said cylinders having ports for admitting air and gas respectively thereto, from a source of supply, a piston in each of said cylinders adapted to overrun said ports respectively and force the air and gas to one of said cylinders, a crank located below each of said pistons, a connecting rod connecting each of said pistons with said crank respectively, a crank casing, a drum provided with a series of peripheral grooves carried by said cranks, and dividing said crank casing into separate crank chambers and means of communication between said crank chambers and said working cylinders, substantially as described.

7. A gas engine comprising a casting having two cylinders therein in open communication at their upper ends, one of which is provided with inlet ports for air and the other with exhaust ports, and having their top edges in alinement with each other, one of said cylinders having gas inlet ports located immediately below said air inlet ports and each of said cylinders having ports for admitting air and gas respectively thereto, from a source of supply, a piston in each of said cylinders adapted to overrun said ports respectively and force the air and gas to one of said cylinders, a crank located below each of said pistons, a connecting rod connecting each of said pistons with said crank respectively, a crank casing, and a drum carried by said cranks and dividing said crank casing into separate crank chambers, substantially as described.

8. A gas engine comprising a casting having two cylinders therein in open communication at their upper ends, one of which is provided with inlet ports for air and the other with exhaust ports, and having their top edges in alinement with each other, one of said cylinders having gas inlet ports located immediately below said air inlet ports and each of said cylinders having ports for admitting air and gas respectively thereto, from a source of supply, a piston in each of said cylinders adapted to overrun said ports respectively and force the air and gas to one of said cylinders, a crank located below each of said pistons, one of which is arranged in advance of the other, a connecting rod connecting each of said pistons with said crank respectively, a crank casing, and a drum carried by said cranks and dividing said crank casing into separate crank chambers, substantially as described.

In testimony whereof, I have signed my name to this specification in the presence of two subscribing witnesses, this tenth day of January, 1908.

BAXTER M. ASLAKSON.

Witnesses:
 FRANK M. ASHLEY,
 A. T. SCHARPS.